United States Patent [19]

Itoh

[11] 4,308,439
[45] Dec. 29, 1981

[54] SWITCHING DEVICE

[75] Inventor: Toshiyuki Itoh, Yokosuka, Japan

[73] Assignee: Nissan Motor Company, Limited, Yokohama, Japan

[21] Appl. No.: 35,990

[22] Filed: May 4, 1979

[30] Foreign Application Priority Data

Jun. 8, 1978 [JP] Japan .................................. 53-68313
Jun. 12, 1978 [JP] Japan .................................. 53-69850

[51] Int. Cl.³ .............................................. H01H 3/14
[52] U.S. Cl. ................................ 200/159 B; 200/5 B; 200/5 E; 200/292
[58] Field of Search .............. 200/159 A, 159 B, 292, 200/5 B, 5 A, 5 E, 181

[56] References Cited

U.S. PATENT DOCUMENTS

| | | | |
|---|---|---|---|
| 3,654,407 | 4/1972 | Kepner et al. | 200/159 B |
| 3,830,991 | 8/1974 | Durocher | 200/86 R |
| 3,859,485 | 1/1975 | Blinklide | 200/85 A |
| 4,128,744 | 12/1978 | Seeger | 200/292 |

FOREIGN PATENT DOCUMENTS

| | | | |
|---|---|---|---|
| 2747425 | 4/1978 | Fed. Rep. of Germany | 200/159 B |
| 722035 | 1/1955 | United Kingdom | 200/159 |
| 1298089 | 11/1972 | United Kingdom | 200/159 B |
| 1454805 | 11/1976 | United Kingdom | 200/159 B |

*Primary Examiner*—Willis Little

[57] ABSTRACT

A switching device comprises a flexible film of insulative material on which is printed a pictorial diagram or the like illustrating a plurality of controlled devices. A plurality of first conductive elements is arranged on a plane in contact with the illustration film and a plurality of second conductive elements is arranged on a second plane spaced from the first plane. In response to a pressure manually applied to the illustration film at a point corresponding to a desired controlled device, the first and second elements of the corresponding pair are brought into electrical contact to complete a circuit through a pair of terminals. Preferably, between each pair of corresponding first and second conductive elements is disposed an elastic element having resistance which varies from a non-conductive value to a conductive value in response to a pressure applied thereto.

2 Claims, 15 Drawing Figures

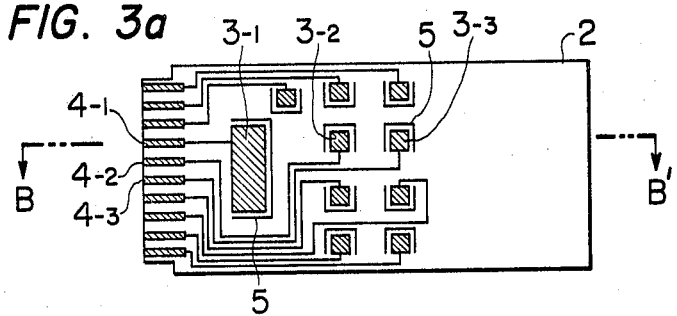
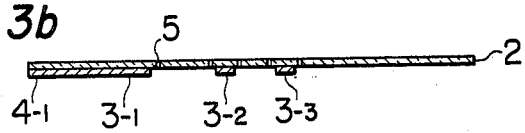
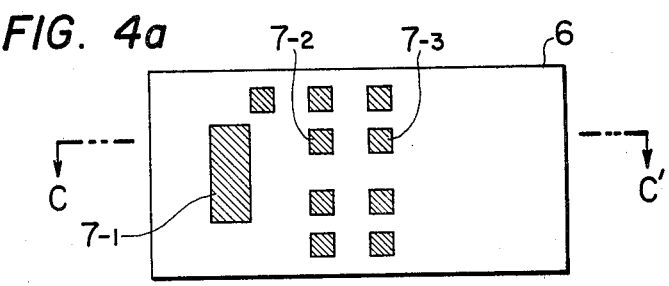
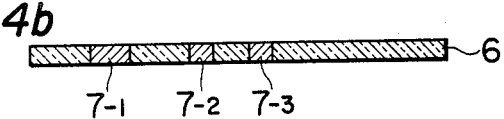
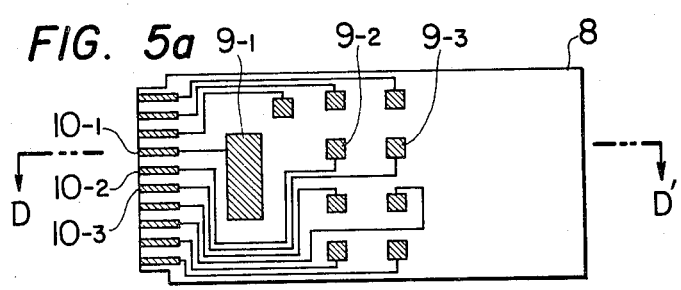
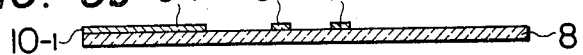

SWITCHING DEVICE

FIELD OF THE INVENTION

The present invention relates generally to pressure sensitive switches and in particular to such a switch having a plurality of pressure responsive contact elements arranged on the corresponding operative positions of controlled devices which are pictorially illustrated on the front face of the switch.

BACKGROUND OF THE INVENTION

The recent general tendency is toward using a pictorial representation on the front contact face of a switch to designate its operating function, rather than literal representation. Conventional methods however employ standardized symbols or marks on individual switches, which sometimes causes confusion because the switches are not positionally related to the actual location of the associated device. This is particularly true to switches provided on the instrument panel of motor vehicles. For safety purposes, ease with which the switches are recognized and operated is very important.

SUMMARY OF THE INVENTION

The switching device of the invention comprises a film of insulative material on which is printed a pictorial diagram illustrating various controlled devices. A plurality of first conductive elements is arranged on a first plane in contact with the film in positions corresponding to the positions of the controlled devices illustrated on the diagram. A plurality of second conductive elements is arranged on a second plane spaced from the first plane in positions corresponding to the positions of the first conductive elements. Terminals are provided for connection to the controlled devices. Responsive to a pressure applied to the illustration film in the position of a desired controlled devices, a corresponding pair of the first and second conductive elements are brought into electrical contact to complete a circuit through a pair of terminals to the desired controlled device.

Preferably, a plurality of normally conductive elements formed of an elastic material is provided between the first and second planes in positions corresponding to the first and second conductive elements. This elastic material exhibits conductivity in response to the application of a pressure applied thereto. This prevents the generation of spark across the contacting faces of the first and second elements due to the absence of an air gap therebetween.

An object of the present invention is to provide a novel switch which minimizes the space required to arrange a plurality of switches.

Another object of the invention is to provide a switch which facilitates recognition of the controlled devices and provides ease of operation.

A further object of the invention is to provide a switch of a nonlocked type having a thickness small enough to permit installation on the surface of a wall.

BRIEF DESCRIPTION OF THE DRAWINGS

The invention will be further described by way of example with reference to the accompanying drawings, in which:

FIG. 1b is a cross-sectional view taken along the lines A—A' of FIG. 1a;

FIG. 3a is a bottom plan view of a first printed circuit board and FIG. 3b is a cross-sectional view taken along the lines B—B' of FIG. 3a;

FIG. 4a is a top plan view of an insulative plate showing a plurality of elastic pressure responsive elements, and FIG. 4b is a cross-sectional view taken along the lines C—C' of FIG. 4a;

FIG. 5a is a top plan view of a second printed circuit board, and FIG. 5b is a cross-sectional view taken along the lines D—D' of FIG. 5a;

FIG. 7b is a cross-sectional view taken along the lines E—E' of FIG. 7a;

FIG. 8b is a cross-sectional view taken along the lines F—F' of FIG. 8a.

DETAILED DESCRIPTION

Figure 1A:
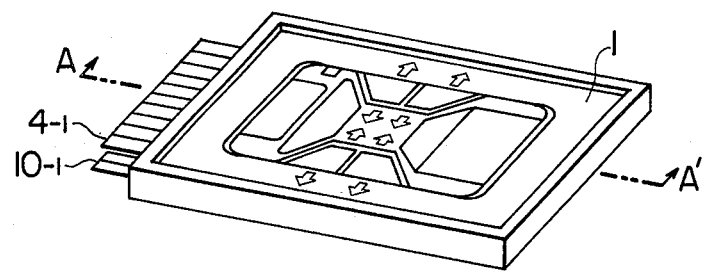
FIG. 1a is a perspective view of the embodiment of the invention.
Figure 1B:
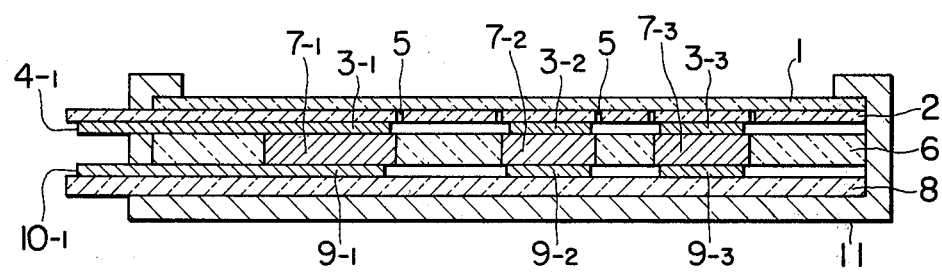
Figure 2:
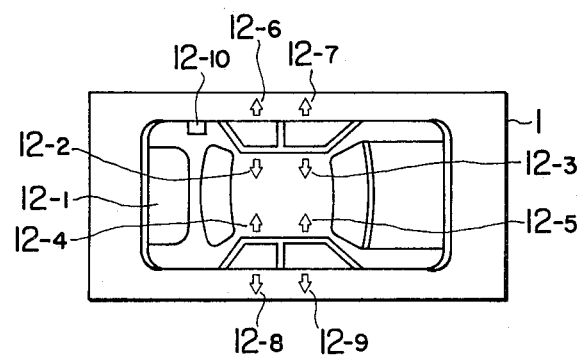
FIG. 2 is a top plan view of the embodiment of FIG. 1a illustrating various controlled areas in a pictorial diagram.

In FIG. 1, reference numeral 1 is a film of a plastic material or its equivalents having the properties of flexibility and electrical insulation, on the surface of which is printed an illustration of a plan view of an automobile, for the purpose of disclosure, as shown in FIG. 2. In FIG. 2, reference numeral 12-1 is a trunk lid, arrows 12-2 to 12-9 designate respectively the opening and closing directions of the vehicle's glass windows, and numeral 12-10 represents the fuel lid of the vehicle.

The switching device of the invention includes a printed circuit board 2 formed of a flexible material, underside of which is printed as shown in FIGS. 3a and 3b a plurality of conductive elements or electrodes 3-1 to 3-10 (only 3-1 to 3-3 being shown for simplicity) in positions corresponding to the positions of the arrows 12-1 to 12-10 in the picture diagram of film 1, the electrodes being connected to the associated terminals 4-1 to 4-10 (only 4-1 to 4-3 being shown for simplicity) arranged on an edge of the printed circuit board 2. A slit 5 is formed in the circuit board 2 in such a manner as to partially surround each electrode 3 to prevent interference between adjacent electrodes to thereby permit each electrode to be pressure responsive only to the component of pressure acted thereon from directly above it.

Beneath the printed circuit board 2 is provided an insulative rigid plate 6 which, as shown in FIGS. 4a and 4b, is formed with a plurality of perforations in which are embedded elements 7-1 to 7-10 of rubber which normally exhibits nonconductivity but becomes conductive in response to a pressure exerted thereon. The elements 7-1 to 7-10 (only 7-1 to 7-3 being shown for simplicity) are positioned respectively to correspond to the positions of the electrodes 3-1 to 3-10 above.

Below the rubber-embedded board 6 is provided a printed circuit board 8 as illustrated in FIGS. 5a and 5b. On the upper surface of the board 8 is printed a pattern of electrodes 9-1 to 9-10 (only 9-1 to 9-3 being shown for simplicity) similar to that shown in FIG. 3a and positioned to correspond to the positions of the rubber elements 7-1 to 7-10 above and connected respectively to terminals 10-1 to 10-10 (only 10-1 to 10-3 being shown for simplicity) arranged on an edge of the board 8.

The film 1 and plates 2, 6 and 8 are in stacked relation as shown in FIG. 1 so that the rubber elements 7 are sandwiched between the associated electrodes 3 and 9 and housed within a framed structure 11 having an opening through which the illustration film 1 is exposed to the outside.

The operation of the embodiment of the invention will be best described with reference to FIG. 6 in which numerals 13 is a finger of the operator, 14 is a relay, 15, a power source, and 16, the solenoid of a trunk lid opener of an automobile.

When the operator depresses the film 1 with his finger 13 on the position illustrating the trunk lid 12-1, the electrode 3-1 is flexed downward to apply pressure to the rubber element 7-1 below due to the flexibility of film 1 and board 2.

The pressure responsive variable resistance rubber element 7-1 rapidly reduces its resistance from the normal value of several tens of megohms to a conductive value of several tens of ohms measured in the direction of application of the pressure, so that there is established a low impedance path between terminals 4-1 and 10-1 via electrodes 3-1, rubber element 7-1 and electrode 9-1. This completes a circuit for the relay 14 to close its contacts which in turn energize the solenoid 16 to thereby open the trunk lid.

In the same manner as described above, connection of power driven window openers or fuel lid opener to the associated terminals permits operation of such devices in response to a pressure applied to the illustration film 1. Other devices to be connected to the switching device of the invention may include an engine hood opener, an electrically driven mirror and a power driven antenna.

Figure 6:
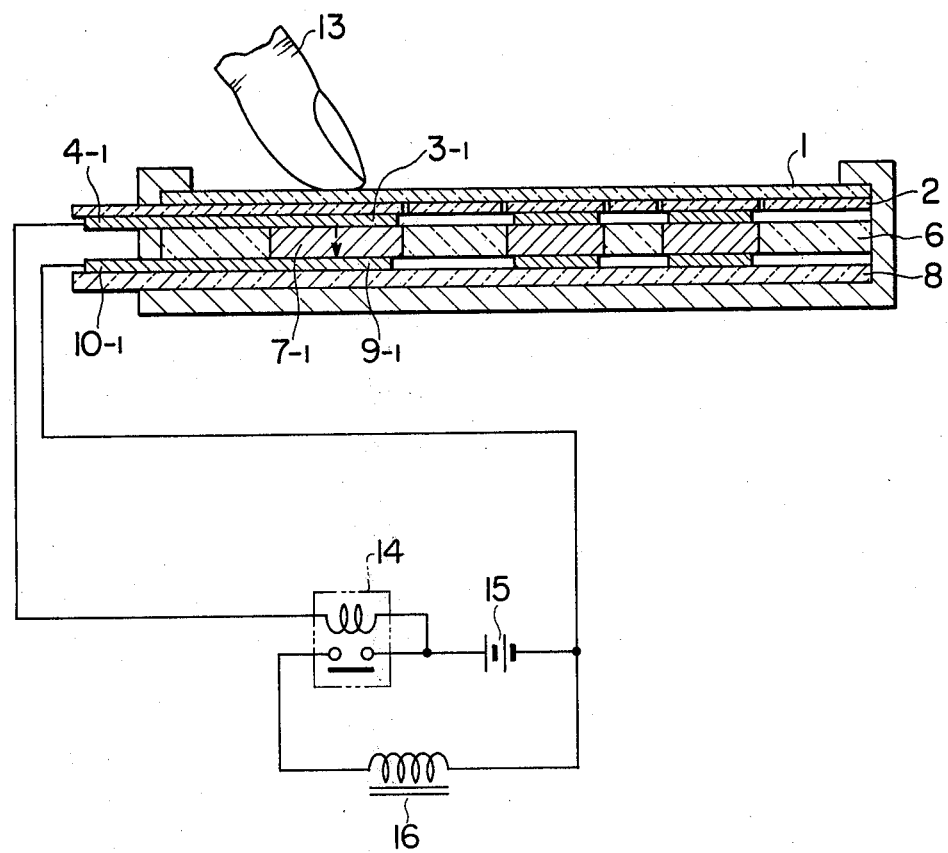
FIG. 6 is a cross-sectional view of the embodiment with an associated electrical circuit shown for explanation of the operation thereof.
Figure 7A:
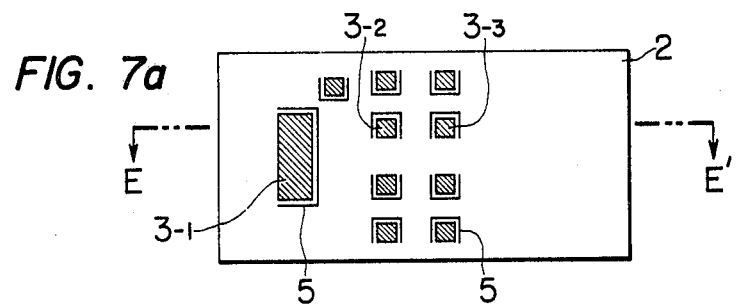
FIG. 7a is a top plan view of the first printed circuit board in a modified form.
Figure 7B:
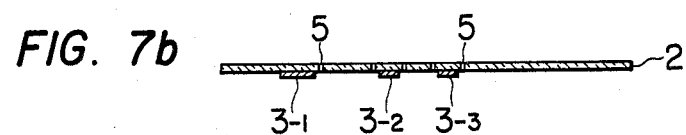

In the circuit of FIG. 6, the relay 14 may be dispensed with if the device to be controlled requires no more than several hundreds milliamperes, permitting such devices to be directly connected to the terminals 4 and 10. Furthermore, flip-flop circuits may be employed to provide various modes of switching operations such as a locked switch which closes in response to the application of a pressure and opens in response to the application of a subsequent pressure, or a switch which closes its contact for a preset interval.

The interference preventive slits 5 may be eliminated if the electrodes are spaced apart a distance greater than 10 millimeters.

Since the electrodes in pairs are in stacked relation and correspond in position to each of the illustrated operative portion 12 on film 1, the area required for each illustrated portion 12 can be held to a minimum, thereby increasing the number of illustrated areas and hence the number of devices to be controlled.

Figure 8A:
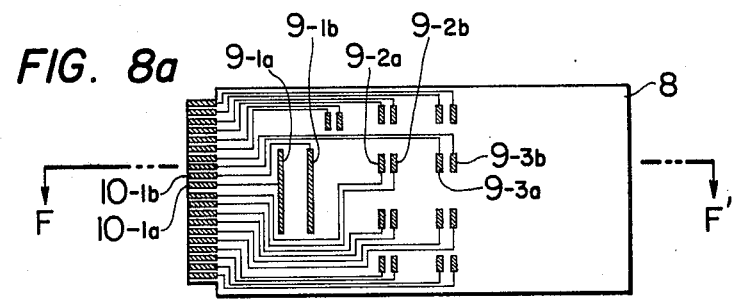
FIG. 8a is a top plan view of the second printed circuit board in a modified form.
Figure 8B:
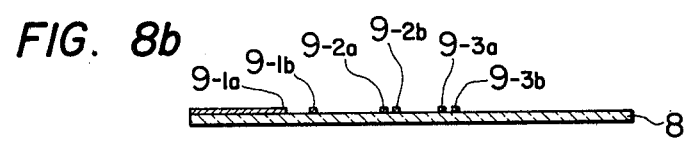
Figure 9:
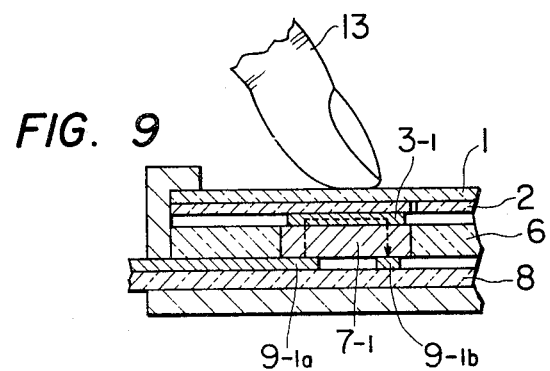
FIG. 9 is a cross-sectional view of the modification of the embodiment of FIG. 1a incorporating the modified printed circuit boards.

A modification of the present invention is illustrated in FIGS. 7a to 8b, in which the printed circuit board 2 is not provided with the terminals 4-1 to 4-10 and each of the electrodes 9 of the printed circuit board 6 is divided into two separate segments a and b which are connected to the associated terminals 10-a and 10-b as shown in FIG. 8a. Therefore, upon the application of a pressure downward, the contact element 3-1, for example, applies a pressure to the associated rubber element 7-1 below it to establish a low impedance path across the electrodes 9-1a and 9-1b, thereby providing a short-circuit across the terminals 10-1a and 10-1b, as best illustrated in FIG. 9.

Although the above description is concerned with an application to automotive vehicles, the present invention could equally be used in other applications such as electrical appliances and system control devices as well.

As described above, the switching device of the invention allows the operator to quickly recognize the location and function of a desired operative element. Since the switching device can accommodate many switching contacts, the size of the device can be kept to a minimum, and because of its thin plate-like structure it can be mounted on any desired place such as on the instrument panel of a vehicle or on the front panel of an electrical appliance, thereby providing a considerable degree of freedom in selecting its location for mounting. Furthermore, the electrical circuit is established via pressure responsive variable resistance elements, the likelihood of contact failure is considerably reduced, and since the circuit is established in response to a feathery touch on the illustration film, the invention provides ease of operation.

The foregoing description shows only preferred embodiments of the invention. Various modifications are possible to those skilled in the art without departing from the scope of the invention which is only limited by the appended claims. For example, as a substitute for the printed circuit boards, pieces of metal foil secured to an insulative flexible board or pieces of pressure responsive conductive rubber embedded in a sheet of nonconductive rubber such as silicone rubber similar to that shown in FIG. 4b but having a smaller thickness, could be used equally as well.

What is claimed is:

1. A switching device comprising a diagram sheet member illustrating a plurality of remote-controlled elements, an insulating member having a plurality of openings therein corresponding to said illustrated controlled elements, first and second printed-circuit boards spaced apart by said insulating member, each of said printed-circuit boards comprising a plurality of electrical circuits each terminating at one end in a position corresponding to the location of a respective one of said illustrated remote-controlled elements to form a pair of electrical contacts in said position with a corresponding termination of the other printed-circuit board and terminating at the other end to form a pair of terminals with a corresponding termination of the other printed-circuit board for connection to an external circuit, and a plurality of resilient, flexible members each accommodated in a respective one of said openings and having a variable resistance from a nonconductive, high resistance value to a conductive, low resistance value in response to a pressure applied thereto, said first printed-circuit board being in contact with said diagram sheet member and having sufficient flexibility so as to allow said pressure responsive variable resistance member to vary in resistance from high to low values when said pressure is applied to said diagram sheet member for establishing a conductive path between said electrical contacts.

2. A switching device comprising a diagram sheet member illustrating a plurality of remote-controlled elements, an insulating member having a plurality of openings therein corresponding to said illustrated remote-controlled elements, first and second printed-circuit boards spaced apart by said insulating member, said first printed-circuit board including a plurality of electrical conductive areas corresponding to said illustrated controlled elements, and said second printed circuit-board including a plurality of electrical circuits in pairs, each pair of said circuits terminating at one end in a position corresponding to a respective one of said illustrated remote-controlled elements to form a pair of electrical contacts in said position and terminating at the other end to form a pair of terminals for connection to an external circuit, and a plurality of resilient, flexible members each accomodated in a respective one of said openings and having a variable resistance from a non-conductive, high resistance value to a conductive, low resistance value in response to a pressure applied thereto, one of said first and second printed-circuit boards being in contact with said diagram sheet member and having sufficient flexibility so as to allow said pressure responsive variable resistance member to vary its resistance from high to low values when said pressure is applied to said diagram sheet member for establishing a conductive path between said electrical contacts through the corresponding conductive area on said first printed-circuit board.

* * * * *